United States Patent
Hegde et al.

(10) Patent No.: US 11,050,644 B2
(45) Date of Patent: Jun. 29, 2021

(54) DYNAMIC DEVICE ANCHORING TO SD-WAN CLUSTER

(71) Applicant: Hewlett Packard Enterprise Development LP, Houston, TX (US)

(72) Inventors: Sanjay Kaniyoor Surendra Hegde, Bangalore (IN); Isaac Theogaraj, Bangalore (IN); Gopakumar Nambisan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/538,339

(22) Filed: Aug. 12, 2019

(65) Prior Publication Data
US 2020/0351182 A1 Nov. 5, 2020

(30) Foreign Application Priority Data
Apr. 30, 2019 (IN) .............................. 201941017236

(51) Int. Cl.
*H04L 12/26* (2006.01)
*G06F 16/28* (2019.01)
*H04L 12/66* (2006.01)

(52) U.S. Cl.
CPC ............ *H04L 43/04* (2013.01); *G06F 16/285* (2019.01); *H04L 12/66* (2013.01); *H04L 43/16* (2013.01)

(58) Field of Classification Search
CPC . H04L 41/12; H04L 43/0876; H04L 12/4633; H04L 45/38; H04L 61/2503; H04L 41/0668; H04L 45/02; H04L 45/306; H04L 47/125; H04L 12/4641; H04L 41/14; H04L 43/04; H04L 43/062; H04L 43/065; H04L 43/0811; H04L 43/0817; H04L 43/0864; H04L 43/10; H04L 45/125; H04L 45/22; H04L 45/28; H04L 45/302; H04L 47/22; H04L 47/24; H04L 47/32; H04L 47/781; H04L 47/825; H04L 61/1511; H04L 61/1523; H04L 63/061;
(Continued)

(56) References Cited

U.S. PATENT DOCUMENTS 8,984,162 B1 3/2015 Allen et al.
9,654,991 B2 5/2017 Yang et al.
(Continued)

OTHER PUBLICATIONS

Clusterlabs, Configuration Explained, Jan. 20, 2019, pp. 1, Retrieved from the Internet on Feb. 28, 2019 from URL: <clusterlabs.org/pacemaker/doc/en-US/Pacemaker/1.1/html/Pacemaker_Explained/_node health strategy.html>.
(Continued)

*Primary Examiner* — Djenane M Bayard
(74) *Attorney, Agent, or Firm* — Hewlett Packard Enterprise Patent Department (57) ABSTRACT

An example network orchestrator of a SD-WAN is configured to classify, based on operating health information, each branch gateway of a cluster in an operating health class of a set of operating health classes. A bucketmap is generated based on the classifications of each branch gateway of the cluster. The bucket map may be transmitted to a leader branch gateway of the cluster. Each branch gateway may be reclassified in an operating health class. An updated bucketmap may be transmitted to a leader branch gateway.

20 Claims, 5 Drawing Sheets

(58) Field of Classification Search
CPC ..... H04L 67/141; H04L 67/18; H04L 67/327; H04L 69/40; H04L 41/0654; H04L 41/0686; H04L 43/16; H04L 12/66; H04L 12/4625; G06F 16/285

See application file for complete search history.

(56) References Cited

U.S. PATENT DOCUMENTS

| | | | |
|---|---|---|---|
| 2007/0253335 A1* | 11/2007 | Bansal | H04L 43/0811 370/238 |
| 2014/0298091 A1 | 10/2014 | Carlen et al. | |
| 2015/0312820 A1 | 10/2015 | Yang et al. | |
| 2017/0026417 A1* | 1/2017 | Ermagan | H04L 63/0272 |
| 2018/0367371 A1 | 12/2018 | Nagarajan et al. | |
| 2019/0020559 A1 | 1/2019 | Cao et al. | |
| 2019/0116504 A1* | 4/2019 | Rusackas | H04L 41/12 |
| 2020/0022005 A1* | 1/2020 | Campos | H04L 43/0876 |
| 2020/0036574 A1* | 1/2020 | Parra | H04L 43/0805 |
| 2020/0162353 A1* | 5/2020 | Szigeti | H04L 43/045 |

OTHER PUBLICATIONS

Ruckus, Ruckus SmartZone 100 and Virtual SmartZone Essentials Administrator Guide, Oct. 2018, pp. 1-330, Retrieved from the Internet on Feb. 28, 2019 from URL: <docs.ruckuswireless.com/smartzone/3.6.2/sz100-vsze-administrator-guide/sz100-vsze-administrator-guide-3-6-2.pdf>.

\* cited by examiner

DYNAMIC DEVICE ANCHORING TO SD-WAN CLUSTER

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to from the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

In some SD-WAN topologies, single network infrastructure devices do not provide the required availability and capacity required to handle the load required by the SD-WAN. For example, a single access point may not be able to handle the full amount of wireless traffic transacted between the attached wireless devices and the rest of the SD-WAN. Among other resolutions to the availability and capacity issues of such network infrastructure devices, one resolution is to cluster multiple network infrastructure devices together and distribute responsibilities between the clustered devices.

When a cluster is initialized, one of the network infrastructure devices is nominated as a leader. The leader has, among other responsibilities, the responsibility of distributing load across the network infrastructure devices of the cluster. In some examples, the leader may assign new client devices and access points (or other network infrastructure devices) (collectively, "anchored devices") to the network infrastructure devices of the cluster using a round robin method. Alternatively, the leader may assign the new anchored devices using a data structure, such as a bucketmap, with the assignment being determined based on a characteristic of the new anchored device. In some examples, certain new anchored devices, such as access points, may be assigned an anchor controller by a network orchestrator rather than by a leader of the cluster.

For example, when a new anchored device, such as a client device or an access point, joins a branch of a SD-WAN, the anchored device requires connections with a branch gateway (BG) for use of at least two services provided by the BG, controller functionality within the branch LAN and routing to the SD-WAN. New network infrastructure devices, such as access points, may anchor to a controller and retrieve configuration information through a tunnel (e.g. an AP tunnel) established between the new network infrastructure device and the anchor controller. New client devices, such as laptops, mobile devices, IoT devices, etc., may anchor to a controller and transceive data with the wider network through a tunnel (e.g. a user tunnel) established between the new client device and the anchor controller. In some examples, the user tunnel is established between an intermediary network infrastructure device (e.g. an access point) and the anchor controller, and the intermediary network infrastructure device routes traffic from the client device through the user tunnel. New client devices that are connected to network infrastructure device, such as an access point, may be assigned an anchor controller by the access point, which retains one or more bucketmaps for assigning anchor controllers to client devices. The subsequently established user tunnels may pass through the access point to the destination anchor controller.

The anchoring process may be initialized in one of many ways. The new anchored device may initialize a discovery service to connect to a controller (whether it be the site controller/BG or a wireless controller, such as an AP), the new anchored device may connect to a controller through a configuration pushed to the new anchored device during provisioning, manually by configuration of a network administrator, or in any other appropriate method. The connected controller then determines, based on information provided by the new anchored device, the appropriate anchor controller, and selects a BG of the cluster to anchor the new anchored device to. The connected controller uses a characteristic of the new anchored device, such as a hash of a portion of the MAC address of the new anchored device, to look up a BG assignment from a bucketmap. The connected controller may be able to access multiple bucketmaps or multiple sections of the bucketmap to select different assignments (such as assignment to a primary anchor controller and assignment to a secondary anchor controller), or to access a bucketmap relevant to the new anchored device (such as depending on the ESSID of the connected controller, the service class, etc.). The connected controller may then send requests and/or commands to the new anchored device and to the assigned BG(s) to establish a tunnel between the new anchored device and its assigned BG(s).

High availability can be achieved in a clustered scenario by assigning secondary anchor controllers and establishing independent tunnels between an anchored device and the primary and secondary anchor controllers. Then, when a BG fails, the anchored device can quickly failover to the secondary anchor controller using the heretofore idle secondary user tunnel until the leader BG can resolve the issue with the failed BG.

Although the above described high availability deployment examples solve issues of failed links and failed controllers, these examples are naïve in the sense that they merely check whether each client device or network infrastructure device is viably anchored. In many situations, it may be possible to receive forewarning of an impending failure, and proactively alter the network to improve resiliency and even to prevent a failure from occurring.

Although the following example is described in relation to a network orchestrator, certain aspects could be performed on a leader branch gateway of the cluster or on any other appropriate device or service.

In an example, the network orchestrator gathers operating health information for each branch gateway of the cluster, including, for example, process memory consumption, process memory leaks, central processing unit (CPU) load, CPU spinlock, CPU scheduling errors, process spinlock, fan status, device temperature, and power supply unit (PSU) status. The network orchestrator then compares each parameter of the operating health information to a set of thresholds. The set of thresholds may be configured by a network administrator, may be hard-coded by a manufacturer, or may be dynamically set by the network orchestrator based on time-series operating health data collected during prior operation of the SD-WAN and, optionally, other networks.

Each threshold is associated with an operating health class of a set of operating health classes. Operating health classes categorize the health of each branch gateway. Operating health classes may, in some examples, be mutually exclusive. For example, a set of operating health classes may include a green class for branch gateways operating within normal health parameters, a yellow class for branch gateways with one or more parameters outside of normal, but not in immediate danger of device or link failure, and a red class for branch gateways that are in immediate danger of device or link failure and/or failed branch gateways. In some other examples, operating health classes may not be mutually exclusive. For examples, a set of operating health classes may include the aforementioned green, yellow, and red classes, as well as specific issue classes such as a process memory leak class, a CPU spinlock class, and a PSU failure class. An example branch gateway with a failed PSU may then be in both the yellow class and the PSU failure class.

As an operating parameter of a branch gateway traverses a threshold, the branch gateway may be removed from certain operating classes and added to other operating classes. For example, if a branch gateway's CPU load goes from 18% to 64%, crossing the yellow class threshold of 55%, the branch gateway may be removed from the green class and added to the yellow class. However, specific combinations of parameters may be required in order to enter or leave certain classes. For example, if the branch gateway's CPU load subsequently goes from 64% to 51%, the branch gateway may stay in the yellow class if one the branch gateway's fans has failed, which is equal to the one failed fan threshold for the yellow class. In certain examples, the network orchestrator may take the trends of the time-series of a parameter into account when determining which class to add a branch gateway to. For example, CPU load may occasionally spike and return to normal operating levels. If the network orchestrator determines that the parameter has only temporarily crossed a threshold and has returned to normal operation, the network orchestrator may treat the branch gateway as if the threshold was not crossed.

Each operating health class may trigger certain actions, including remapping one or more bucketmaps for user anchoring. For example, if a BG moves from a green class to a yellow class due to an operating parameter moving above a yellow class threshold, an updated bucketmap for anchoring new devices to the branch gateways may be generated that reduces or eliminates the likelihood of a new device being anchored to the now-yellow-class branch gateway. Multiple bucketmaps may be generated for a branch or campus, based on various partitions of the site (e.g. for each service set identifier (SSID)), and based on various roles (e.g. primary anchor, secondary anchor). In some examples, bucketmaps assign only client devices to controllers, and access points establish tunnels with an anchor controller based on a different method, such as assignment by the network orchestrator. In such examples, certain relevant bucketmaps may be transmitted to the access points for client device assignment.

Additional measures can be taken with the bucketmap, as well. For example, if a branch gateway is added to the red class, indicating imminent device failure, an updated bucketmap may be generated for the secondary user tunnels for existing devices connected to the cluster, excluding the now-red-class branch gateway. Then, each client device anchored to the now-red-class branch gateway may be instructed to switch over to their respective secondary user tunnels, and an updated bucketmap may also be generated for the primary user tunnels for existing devices connected to the cluster that establishes new primary and secondary user tunnels for all devices previously connected to the now-red-class branch gateway to terminate those imperiled connections. Likewise, APs anchored to a now-red-class branch gateway may be instructed to switch over to their respective secondary AP tunnels, and the network orchestrator may update AP tunnel assignments to exclude the now-red-class branch gateway.

Further, if the deteriorating branch gateway is the leader of the cluster, leader responsibilities may be transitioned to a branch gateway that is healthier (e.g. in the green class). For example, the network orchestrator, upon detecting that the cluster leader is in the red class, sends a SDN control message to the branch gateway cluster that instructs the cluster to select a new leader. In some examples, the SON control message bypasses the cluster selection processes and canonizes a new leader.

In addition to updating the bucketmaps, in less immediately dire situations such as when a branch gateway is added to the yellow class, client devices primarily anchored to the now-yellow-class branch gateway, may be instructed to switch the usage of their primary and secondary user tunnels, such that the new primary tunnel (i.e. the old secondary tunnel) anchors the device to a green class branch gateway, and the new secondary tunnel (i.e. the old primary tunnel) anchors the client device to the now-yellow-class branch gateway, reducing the processing and routing load on the now-yellow-class branch gateway. Likewise, APs anchored to a now-yellow-class branch gateway may be instructed to switch over to their respective secondary AP tunnels.

The network orchestrator may schedule additional remediation actions to be taken for certain branch gateways depending on which class(es) they are added to and which parameters are outside of normal operating ranges. For example, a branch gateway in the yellow class may have a process with a slow memory leak. The operating health information shows that the process memory consumption has raised beyond a yellow class threshold. The network orchestrator may take immediate action with the bucketmap and existing anchored devices, and the network orchestrator may also defer additional action to a time when usage of the branch gateway cluster is less, such as during night for the affected SD-WAN site, during a weekend, or during other determined non-peak usage times. The deferred additional actions may include terminating and restarting a malfunctioning process, rebooting the branch gateway, and gathering diagnostic information. Any action may be executed immediately or may be deferred depending on the class and the specific parameters causing the branch gateway to be assigned to the class.

Additionally, the network orchestrator may send information about the operational health of degrading branch gateways to a network administrator. For example, the network orchestrator may forward gathered diagnostic information for branch gateways in the red class to the network administrator, as well as relevant operational health information.

If remediation actions (or changes in the dynamic behavior of the network) cause an improvement in the operational health of a branch gateway, the network orchestrator may move the branch gateway to the appropriate operational health class, alter current and future anchoring assignments to take advantage of the newfound health of the branch gateway, and remove any pending remediation actions scheduled due to the branch gateway being in the prior class.

Although this disclosure primarily focuses on the application of features to a software defined wide area network, it would be apparent to a person having ordinary skill in the art that the features of this disclosure are also applicable to other network topologies, including campus to cloud architectures, and including topologies where access points are directly controlled by a network orchestrator.

Figure 1:
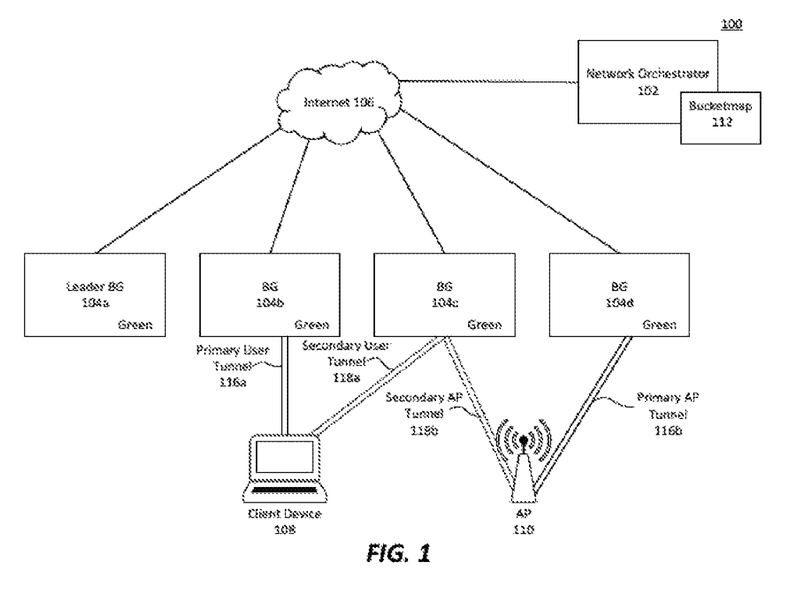
FIG. 1 illustrates an example software defined wide area network (SD-WAN) including a cluster of branch gateways.

FIG. 1 illustrates an example software defined wide area network (SD-WAN) including a cluster of branch gateways. SD-WAN 100 includes a network orchestrator 102 connected to branch gateways (BGs) 104 through Internet 106. The branch controlled by BGs 104 includes a client device 108 and an access point (AP) 110. Upon initialization, client device 108 and AP 110 are each respectively assigned primary and secondary anchor controllers. Although client device 108 is illustrated without intervening devices between client device 108 and BGs 104b and 104c, client device 108 may be communicatively coupled to an intervening network infrastructure device (not shown) such as an AP. In some examples, client device 108 may initially connect with the intervening network infrastructure device, and receive an assignment to anchor controllers (BGs 104b and 104c) from the intervening network infrastructure device. AP 110 may initially connect with network orchestrator 102 and receive an assignment to anchor controllers (BGs 104d and 104c) from network orchestrator 102. Client device 108 is connected to BG 104b through primary user tunnel 116a and to BG 104c through secondary user tunnel 118a. AP 110 is connected to BG 104d through primary AP tunnel 116b and to BG 104c through secondary AP tunnel 118b. Network orchestrator 102 includes a bucketmap 112.

BGs 104 form a cluster that provides controller and gateway services to the branch site of SD-WAN 100 including client device 108 and AP 110. A leader BG 104a is selected. In the example of FIG. 1, network orchestrator 102 gathers information from BGs 104 and generates a bucketmap 112 for use in anchoring devices of the branch to a BG 104 of the cluster. For example, a bucketmap 112 may include primary anchor controller assignments for each hashed final byte of a new device's MAC address. An example bucketmap is reproduced below, where A, B, C, and D refer to BGs 104a, 104b, 104c, and 104d, respectively.

| | |
|---|---|
| 0-15 | A B C D A D C A B A C D A D C B |
| 16-31 | D A D C A B A C D A D C B D C A |
| 32-47 | A D C B D C A B A C A B C D A D |
| 48-63 | C B D C A A B C D A D C A B C A |
| 64-79 | A B A C D A D C B D C A D C B D |
| 80-95 | B D C A B A C A B A B A C D C A |
| 96-111 | C D A D C A B A C D A D C B D A |
| 112-127 | C A B A C D A D C B C A A B C D |
| 128-143 | A B C D A D C A B A C D A D C B |
| 144-159 | D A D C A B A C D A D C B D C A |
| 160-175 | A D C B D C A B A C A B C D A D |
| 176-191 | C B D C A A B C D A D C A B C A |
| 192-207 | A B A C D A D C B D C A D C B D |
| 208-223 | B D C A B A C A B A B A C D C A |
| 224-239 | C D A D C A B A C D A D C B D A |
| 240-255 | C A B A C D A D C B C A A B C D |

Network orchestrator 102 may generate multiple bucketmaps 112 for different anchoring purposes. For example, a first bucketmap 112 may be used to anchor new devices to a primary controller and a second bucketmap 112 may be used to anchor new devices to a secondary controller. Bucketmaps 112 may be generated to assign anchor controllers to portions of the branch site, including by service class and by extended service set identification (ESSID).

Network orchestrator 102 receives operating health information from each BG 104. Operating health information includes parameters that network orchestrator 102 compares to thresholds associated with operating health classes. For example, BGs 104 each have operating health information wherein each parameter is within the class thresholds required for green operating health class. In the example of FIG. 1 there are three operating health classes in the set of operating health classes. Green class indicates that all parameters of a BG's operating health info are within normal operating thresholds. Yellow class indicates that all parameters of a BG's operating health info are within strained operating thresholds, but one or more parameters are outside of normal operating thresholds. Red class indicates that one or more parameters are outside of strained operating thresholds, indicating that the one or more parameters are operating in a severe malfunction state. As an example parameter, if the controller device model for BGs 104 includes a bank of six (6) fans, 0-1 fans may fail and still be within normal operating thresholds because with 5 or 6 fans still operational, the BG 104 can still operate indefinitely and can accommodate additional failures without imminent failure of the device. 2-3 fans may fail and still be within strained operating thresholds because with 3 or 4 fans still active, the BG 104 can still operate at normal operating loads, but an abnormally large operating load or another fan failure may result in imminent failure of the device. If 4 or more fans fail, the device may be operating in a severe malfunction state because device failure is imminent at normal operating loads.

Network orchestrator 102, based on the operating health information received from BGs 104 classifies all BGs 104 into the green class. Green class indicates that the BGs 104 are operating normally. Based on all BGs 104 of the cluster operating normally, bucketmap 112 is generated. Network orchestrator 102 may forward bucketmap 112 to the BGs 104, only to leader BG 104a, or to the BGs 104, AP 110 and other APs of the site.

When client device 108 initializes on SD-WAN 100 in the branch, an initialization connection is established between a controller and client device 108. Client device 108 provides information to the connected controller, including identifying information of client device 108. Using the identifying information of client device 108, the connected controller selects a primary anchor controller (BG 104b) to anchor client device 108 to based on bucketmap 112. For example, if client device 108 has a MAC address with a last byte of 0x82 (130), then the connected controller will select BG 104c using the above bucketmap 112. The connected controller will then send anchor instructions to client device 108 via the initialization connection and to BG 104b to establish primary user tunnel 116a. The connected controller may then determine a secondary anchor controller using a secondary anchor bucketmap 112. For example, if client device 108 has a MAC address with a last byte of 0x82 (130), then the secondary anchor bucketmap 112 would cause the connected controller to select BG 104c for the secondary anchor controller of client device 108.

In some examples, when AP 110 joins the branch, it may establish an initialization connection with leader BG 104a. Leader BG 104a receives identifying information about AP 110 through the initialization connection, and leader BG 104a selects primary and secondary anchor controllers based on bucketmaps 112. In the example of FIG. 1, leader BG 104a anchors AP 110 to BG 104d via primary AP tunnel 116b and anchors AP 110 to BG 104c through secondary AP tunnel 118b.

In another example, when AP 110 joins the branch, it may establish an initialization connection with network orchestrator 102. Network orchestrator 102 then configures AP 110 to establish tunnels between AP 110 and an anchor controller (BG 104d) of the cluster. Network orchestrator 102 then transmits bucketmap 112 to AP 110 to assign each new client device connected to AP 110 to an anchor controller. In such an example, user tunnels of a client device connected to AP 110 may be established by a method similar to how user tunnels 116a and 116b are described to be established above. Such user tunnels may pass through AP 110.

Figure 2:
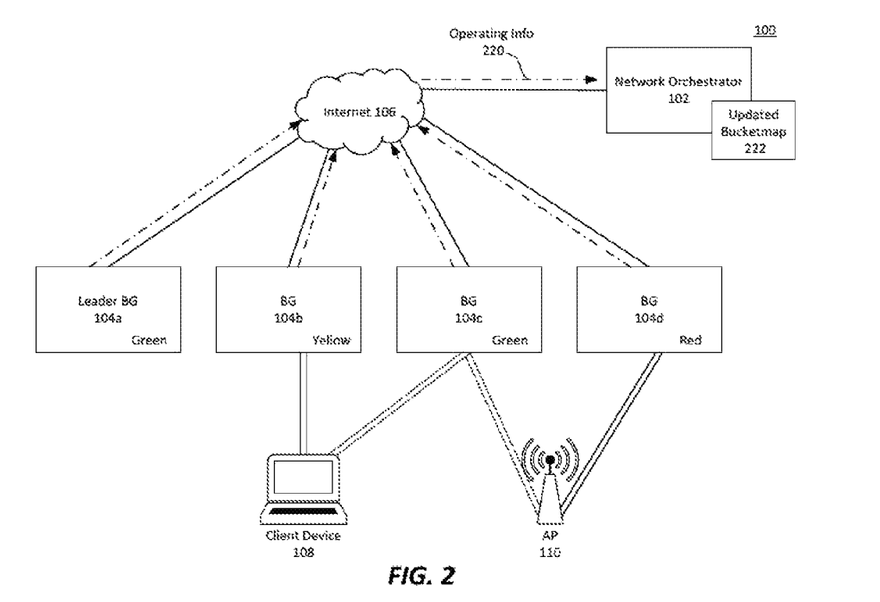
FIG. 2 illustrates an example software defined wide area network (SD-WAN) including a cluster of branch gateways transmitting operating information to a network orchestrator.

FIG. 2 illustrates an example software defined wide area network (SD-WAN) including a cluster of branch gateways transmitting operating information to a network orchestrator. BGs 104 transmit operating health information 220 through Internet 106 to network orchestrator 102. Operating health information 220 may include parameters such as process memory consumption, process memory leaks, central processing unit (CPU) load, CPU spinlock, CPU scheduling errors, process spinlock, fan status, device temperature, and power supply unit (PSU) status. BGs 104 may provide operating health information 220 periodically, when certain events occur (e.g. when a parameter exceeds certain thresholds), on demand from network orchestrator 102, and at any other appropriate cadence. Network orchestrator 102, upon receiving operating health information 220, may integrate the operating health information 220 with respective previous time-series data. Network orchestrator 102 then updates bucketmap 112 to create updated bucketmap 222 using operating health information 220.

For example, BG 104b sends operating health information 220 including a parameter that is above a threshold for normal operation, but within a threshold for strained operation. For example, BG 104b may have a CPU load of 64% and the threshold for normal operation may be 60% and the threshold for strained operation may be 80%. Due to BG 104b having at least one parameter outside of its normal operating threshold, but no parameters outside of its strained operating threshold, network orchestrator 102 moves BG 104b from green class to yellow class.

As another example, BG 104d sends operating health information 220 including a parameter that is above a threshold for strained operation. For example, BG 104d may have a CPU load of 93% and the threshold for strained operation may be 80%. Due to BG 104d having at least one parameter outside of its strained operating threshold, network orchestrator 102 moves BG 104d from green class to red class.

In some examples, network orchestrator 102, rather than basing updated bucketmap 222 directly on operation health information 220, bases updated bucketmap 222 on updated operating health classes for BGs 104. For example, since BG 104b is now in yellow class and BG 104d is now in red class, updated bucketmap 222 may have a reduced likelihood of assigning new devices to BG 104b, and no likelihood of assigning new devices to BG 104d. Additional actions may be taken, as further described in FIG. 3.

Figure 3:
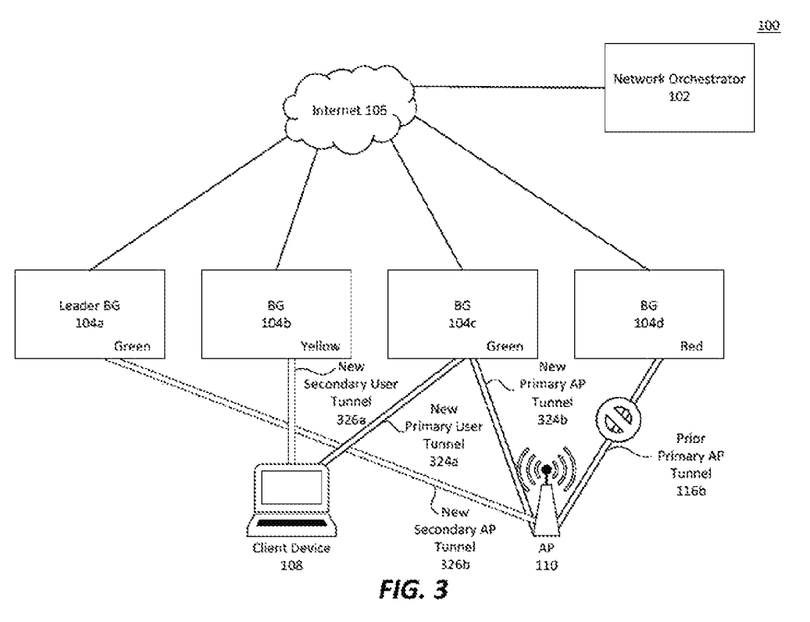
FIG. 3 illustrates an example software defined wide area network (SD-WAN) including a cluster of branch gateways with reconfigured user tunnels.

FIG. 3 illustrates an example software defined wide area network (SD-WAN) including a cluster of branch gateways with reconfigured user tunnels. Since BG 104d is in red class, which indicates an imminent device failure, network orchestrator 102 may take additional actions beyond removing BG 104d from the updated bucketmap. Network orchestrator 102 may transmit a command that causes prior primary AP tunnel 116b between BG 104d and AP 110 to be severed, and the prior secondary AP tunnel between AP 110 and BG 104c to become the new primary AP tunnel 324b for AP 110. Further, network orchestrator 102 may cause a new secondary AP tunnel 326b to be established between AP 110 and BG 104a.

Likewise, since BG 104b is in yellow class and BG 104c is in green class, network orchestrator 102 may cause client device 108 to swap its primary and secondary user tunnels. After the swap, new primary user tunnel 324a connects client device 108 to BG 104c and new secondary tunnel 326a connects client device 108 to BG 104b. This swap may reduce the load on BG 104b, which is currently strained and increase the load on BG 104c which is currently operating normally.

Figure 4:
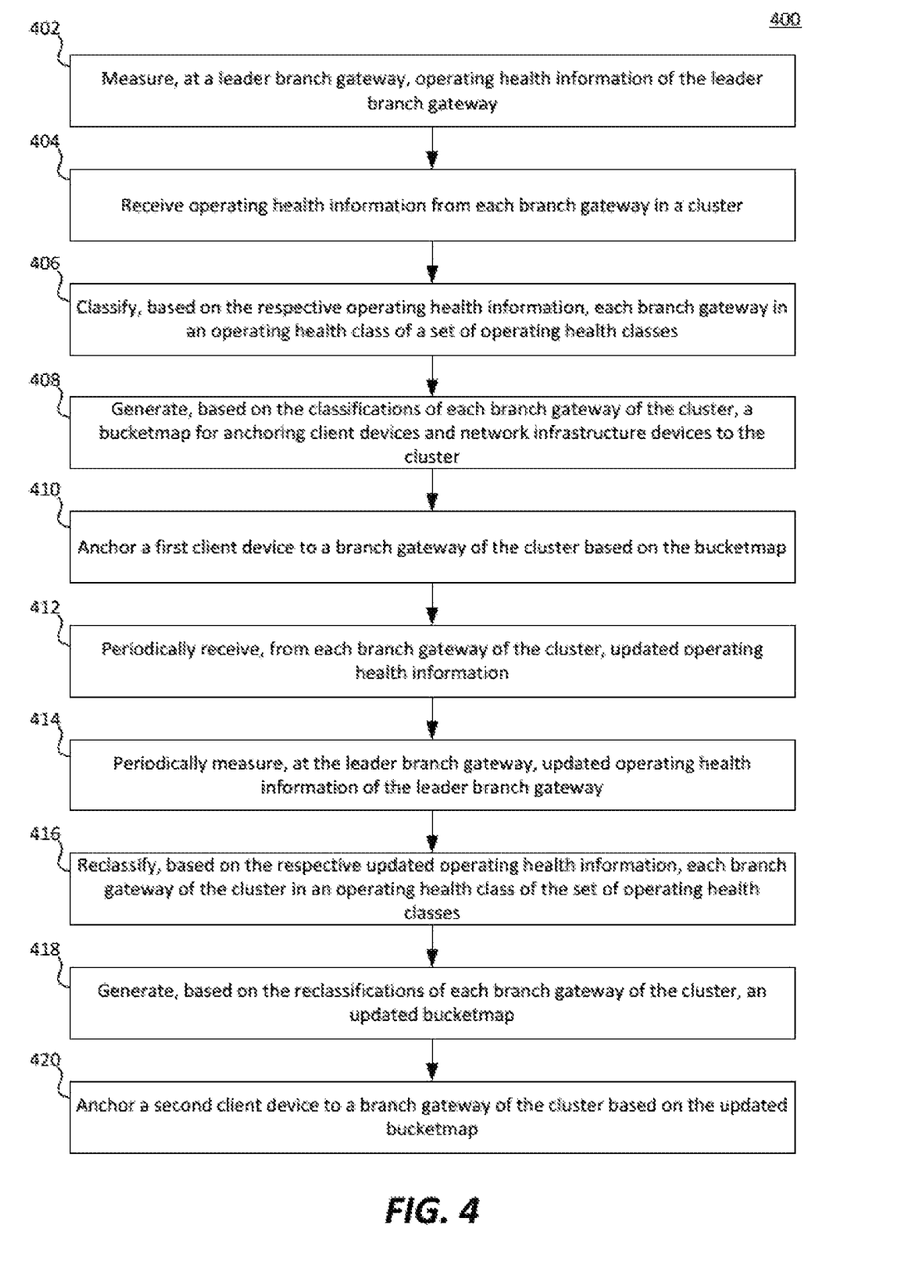
FIG. 4 is a flowchart illustrating an example method for example for dynamically assigning and reconfiguring user tunnels in a branch gateway cluster.

FIG. 4 is a flowchart illustrating an example method for example for dynamically assigning and reconfiguring user tunnels in a branch gateway cluster. Method 400 may be executed on a leader controller (branch gateway) of a cluster of branch gateways. Alternatively, method 400 may be executed on a network orchestrator.

In block 402, operating health information of a leader branch gateway is measured at the leader branch gateway. Operating health information may include operating health parameters comprising at least one of: device operating temperature, fan operational status, power supply operational status, process memory consumption, overall memory consumption, flash memory consumption, and CPU load.

In block 404, operating health information is received from each branch gateway in the cluster. In some examples, the operating health information is received through intra-cluster tunnels. In some other examples, the operating health information is received via the Internet.

In block 406, each branch gateway is classified, based on the respective operating health information, into an operating health class of a set of operating health classes. In some examples, each branch gateway is classified based on comparing each operating health parameter of the respective branch gateway's operating health information to a set of class thresholds, wherein when all operating health parameters are within a first set of thresholds, the respective branch gateway is classified into a first operating health class, and when one or more operating health parameters are within a second set of thresholds but not within the first set of thresholds, the respective branch gateway is classified into a second operating health class, and when one or more operating health parameters are not within the first set of thresholds nor the second set of thresholds, the respective branch gateway is classified into a third operating health class.

In block 408, a bucketmap is generated, based on the classifications of each branch gateway of the cluster, for anchoring client devices and, in some examples, network infrastructure devices to the cluster. In some examples, the bucketmap includes a first data structure for anchoring devices to primary branch gateways and a second data structure for anchoring devices to secondary branch gateways. In some other examples, multiple bucketmaps are generated. Primary branch gateways (i.e. primary anchor controllers) may actively forward traffic associated with devices anchored to the respective primary branch gateway, and secondary branch gateways (i.e. secondary anchor controllers) may form idle connections with devices anchored to the respective secondary branch gateways.

In block 410, a first client device is anchored to a branch gateway of the cluster based on the bucketmap. In some examples, the first client device provides identifying information to a connected controller, and the connected controller selects the branch gateway to which the first client device is anchored by using the identifying information to look up the selected branch gateway in the bucketmap.

In block 412, updated operating health information is periodically received from each branch gateway of the cluster. In some examples, the updated operating health information is combined with prior operating health information, like that received in block 404, to create time-series operating health data.

In block 414, updated operating health information of the leader branch gateway is periodically measured at the leader branch gateway. In some examples, the updated operating health information is combined with prior operating health information, like that measured in block 402, to create time-series operating health data.

In block 416, each branch gateway of the cluster is reclassified in an operating health class of the set of operating health classes based on the respective updated operating health information. In some examples, reclassification accounts for trends in the time-series operating health data, such as temporary crosses of thresholds or trends toward or away from a threshold. Based on the reclassification, a remedy action may be executed during a non-peak load time for each branch gateway in a subset of operating health classes. For example, a branch gateway in red class may be rebooted at night to reduce the severity of the degradation of device health.

In block 418, an updated bucketmap is generated based on the reclassification of each branch gateway of the cluster. Branch gateways that have degraded in health are less likely to have new devices anchored to them and branch gateways that have improved in health are more likely to have new devices anchored to them.

In block 420, a second client device is anchored to a branch gateway of the cluster based on the updated bucketmap. In some examples, the second client device provides identifying information to a connected controller, and the connected controller selects the branch gateway to which the second client device is anchored by using the identifying information to look up the selected branch gateway in the updated bucketmap.

Figure 5:
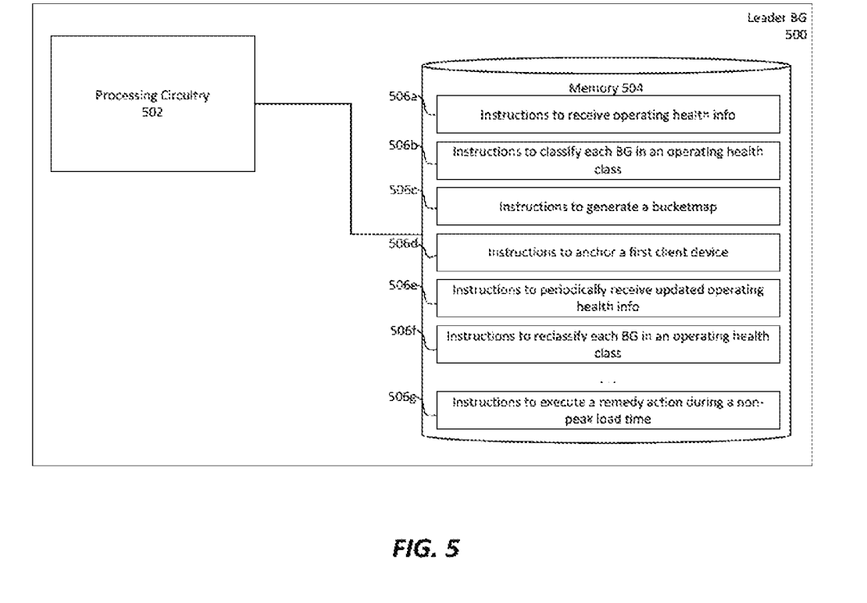
FIG. 5 is an illustration of an example leader branch gateway of a SD-WAN.

FIG. 5 is an illustration of an example leader branch gateway of a cluster of branch gateways of a SD-WAN. As previously mentioned, actions and operations described in this disclosure can be executed on a leader branch gateway, on a network orchestrator, on any other appropriate device or service, or any combination thereof.

Leader BG 500 includes processing circuitry 502 communicatively coupled to memory 504. Memory 504 includes instructions 506 that, when executed on processing circuitry 502, cause leader BG 500 to perform various actions. For example, instructions 506a cause leader BG 500 to receive, from each branch gateway of the cluster, operating health information. Operating health information may, in some examples, include operating health parameters comprising at least one of: device operating temperature, fan operational status, power supply operational status, process memory consumption, overall memory consumption, flash memory consumption, and CPU load.

Instructions 506b cause leader BG 500 to classify, based on the operating health information, each branch gateway of the cluster in an operating health class of a set of operating health classes. The classification may be based on comparing each operating health parameter to a set of class thresholds, wherein when all operating health parameters are within a first set of thresholds, the respective branch gateway is classified into a first operating health class, and when one or more operating health parameters are within a second set of thresholds but not within the first set of thresholds, the respective branch gateway is classified into a second operating health class, and when one or more operating health parameters are not within the first set of thresholds nor the second set of thresholds, the respective branch gateway is classified into a third operating health class.

Instructions 506c cause leader BG 500 to generate, based on the classifications of each branch gateway of the cluster, a bucketmap. Instructions 506d cause leader BG 500 to anchor a first client device to a branch gateway of the cluster based on the bucketmap. Instructions 506e cause leader BG 500 to periodically receive, from each branch gateway of the cluster, updated operating health information.

Instructions 506f cause leader BG 500 to reclassify, based on the updated operating health information, each branch gateway of the cluster in an operating health class of the set of operating health classes. In some examples, the reclassification of a branch gateway is based, in part, on time-series trends of the operating health information.

Additional instructions may cause leader BG 500 to generate, based on the reclassifications of each branch gateway of the cluster, an updated bucketmap and anchor a second client device to a branch gateway of the cluster based on the updated bucketmap.

Instructions 506g cause leader BG 500 to execute a remedy action during a non-peak load time for each branch gateway in a subset of operating health classes. For example, leader BG 500 may command a BG to reboot, to reinitialize a process, or to collect logs for forwarding to a network administrator.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" can often describe both the classification of packets to a flow pattern, as well as the path those classified packets take through the SDN overlay network. "Routes" more often refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

We claim:

1. A branch gateway of a cluster, comprising:
   processing circuitry; and
   a memory including instructions that, when executed on the processing circuitry, cause the branch gateway to:

receive, from each branch gateway of the duster, operating health information;

classify, based on the operating health information, each branch gateway of the cluster in an operating health class of a set of operating health classes;

generate, based on the classifications of each branch gateway of the cluster, a bucketmap;

anchor a first device to a branch gateway of the cluster based on the bucketmap;

periodically receive, from each branch gateway of the cluster, updated operating health information;

reclassify, based on the updated operating health information, each branch gateway of the cluster in an operating health class of the set of operating health classes;

generate, based on the reclassifications of each branch gateway of the cluster, an updated bucketmap; and anchor a second client device to a branch gateway of the cluster based on the updated bucketmap.

2. The branch gateway of claim 1, wherein operating health information includes operating health parameters comprising at least one of: device operating temperature, fan operational status, power supply operational status, process memory consumption, overall memory consumption, flash memory consumption, and CPU load.

3. The branch gateway of claim 2, wherein each branch gateway is classified into an operating health class based on comparing each operating health parameter to a set of class thresholds.

4. The branch gateway of claim 3, wherein when all operating health parameters are within a first set of thresholds, the respective branch gateway is classified into a first operating health class, and when one or more operating health parameters are within a second set of thresholds but not within the first set of thresholds, the respective branch gateway is classified into a second operating health class, and when one or more operating health parameters are not within the first set of thresholds nor the second set of thresholds, the respective branch gateway is classified into a third operating health class.

5. The branch gateway of claim 1, wherein reclassifying each branch gateway is based, in part, on time-series trends of the operating health information.

6. The branch gateway of claim 1, including instructions to cause the branch gateway to execute a remedy action during a non-peak load time for each branch gateway in a subset of operating health classes.

7. A device comprising:
processing circuitry; and
a memory including instructions that, when executed on the processing circuitry, execute a network orchestrator of a software-defined wide area network (SD-WAN) configured to:
classify, based on operating health information, each branch gateway of a cluster in an operating health class of a set of operating health classes;
generate, based on the classifications of each branch gateway of the cluster, a bucketmap;
transmit the bucketmap to a leader branch gateway of the cluster, wherein the bucketmap informs the leader branch gateway which branch gateway of the cluster to anchor a first client device to;
reclassify, based on updated operating health information, each branch gateway of the duster in an operating health class of the set of operating health classes;
transmit, based on the reclassifications of each branch gateway of the cluster, an updated bucketmap to a leader branch gateway of the cluster, wherein the updated bucketmap informs the leader branch gateway which branch gateway of the cluster to anchor a second client device to.

8. The device of claim 7, wherein operating health information includes operating health parameters comprising at least one of: device operating temperature, fan operational status, power supply operational status, process memory consumption, overall memory consumption, flash memory consumption, and CPU load.

9. The device of claim 7, wherein the network orchestrator is further configured to periodically receive, from each branch gateway of the cluster, the operating health information.

10. The device of claim 9, wherein operating health information includes time-series trends of operating health parameters.

11. The device of claim 7, wherein the bucketmap includes a first data structure for anchoring devices to primary branch gateways and a second data structure for anchoring devices to secondary branch gateways.

12. The device of claim 11, wherein primary branch gateways actively forward traffic associated with devices anchored to the respective primary branch gateway, and secondary branch gateways form idle connections with devices anchored to the respective secondary branch gateways.

13. The device of claim 7, wherein the network orchestrator is further configured to transmit, during a non-peak load time, a reboot message to branch gateways in a subset of operating health classes.

14. A method, comprising:
measuring, at a leader branch gateway, operating health information of the leader branch gateway;
receiving operating health information for each branch gateway in a duster;
classifying, based on the respective operating health information, each branch gateway of the cluster in an operating health class of a set of operating health classes;
generating, based on the classifications of each branch gateway of the duster, a bucketmap for anchoring client devices and network infrastructure devices to the duster;
anchoring a first client device to a branch gateway of the cluster based on the bucketmap;
periodically receiving, from each branch gateway of the cluster, updated operating health information;
periodically measuring, at the leader branch gateway, updated operating health information of the leader branch gateway;
reclassifying, based on the respective updated operating health information, each branch gateway of the cluster in an operating health class of the set of operating health classes;
generating, based on the reclassifications of each branch gateway of the cluster, an updated bucketmap; and
anchoring a second client device to a branch gateway of the cluster based on the updated bucketmap.

15. The method of claim 14, wherein operating health information includes operating health parameters comprising at least one of: device operating temperature, fan operational status, power supply operational status, process memory consumption, overall memory consumption, flash memory consumption, and CPU load.

16. The method of claim 15, wherein each branch gateway is classified into an operating health class based on comparing each operating health parameter to a set of class thresholds.

17. The method of claim 15, wherein when all operating health parameters are within a first set of thresholds, the respective branch gateway is classified into a first operating health class, and when one or more operating health parameters are within a second set of thresholds but not within the first set of thresholds, the respective branch gateway is classified into a second operating health class, and when one or more operating health parameters are not within the first set of thresholds nor the second set of thresholds, the respective branch gateway is classified into a third operating health class.

18. The method of claim 14, wherein the bucketmap includes a first data structure for anchoring devices to primary branch gateways and a second data structure for anchoring devices to secondary branch gateways.

19. The method of claim 18, wherein primary branch gateways actively forward traffic associated with devices anchored to the respective primary branch gateway, and secondary branch gateways form idle connections with devices anchored to the respective secondary branch gateways.

20. The method of claim 14, further comprising executing a remedy action during a non-peak load time for each branch gateway in a subset of operating health classes.

* * * * *